US009604669B2

(12) United States Patent
Sonnenburg et al.

(10) Patent No.: US 9,604,669 B2
(45) Date of Patent: Mar. 28, 2017

(54) DRIVE DEVICE FOR A TRACKED VEHICLE

(71) Applicant: ZF Friedrichshafen AG, Friedrichshafen (DE)

(72) Inventors: Henning Sonnenburg, Ravensburg (DE); Ralf Boss, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 14/777,874

(22) PCT Filed: Feb. 18, 2014

(86) PCT No.: PCT/EP2014/053050
§ 371 (c)(1),
(2) Date: Sep. 17, 2015

(87) PCT Pub. No.: WO2014/146838
PCT Pub. Date: Sep. 25, 2014

(65) Prior Publication Data
US 2016/0272241 A1    Sep. 22, 2016

(30) Foreign Application Priority Data
Mar. 18, 2013   (DE) .................. 10 2013 204 672

(51) Int. Cl.
*B62D 11/10* (2006.01)
*B62D 11/14* (2006.01)
(Continued)

(52) U.S. Cl.
CPC ............. *B62D 11/14* (2013.01); *B60K 1/02* (2013.01); *B62D 11/04* (2013.01); *B62D 55/06* (2013.01)

(58) Field of Classification Search
CPC .......... B62D 11/04; B62D 11/14; B62D 55/06
(Continued)

(56) References Cited

U.S. PATENT DOCUMENTS 1,991,094 A    2/1935  Higley
4,998,591 A    3/1991  Zaunberger
(Continued)

FOREIGN PATENT DOCUMENTS

DE           37 28 171 A1     3/1989
DE    10 2004 009 030 A1     9/2005
(Continued)

OTHER PUBLICATIONS

German Search Report Corresponding to 10 2013 204 672.3 mailed Nov. 8, 2013.
(Continued)

*Primary Examiner* — Tony Winner
(74) *Attorney, Agent, or Firm* — Davis & Bujold, PLLC; Michael J. Bujold

(57) ABSTRACT

A drive mechanism (10) for a tracked vehicle. The drive mechanism includes an electric drive motor (1) for supplying drive power and an electric steering motor (3) for supplying steering power. Mechanical drive elements (4, 5) transmit reactive power between a right-hand drive side (12) and a left-hand drive side (11) when driving around a curve or bend. An electric auxiliary motor (2) selectively assists either the drive motor (2) or the steering motor (3).

10 Claims, 1 Drawing Sheet

(51) Int. Cl.
*B62D 11/04* (2006.01)
*B60K 1/02* (2006.01)
*B62D 55/06* (2006.01)

(58) Field of Classification Search
USPC .................................................. 180/6.44, 6.5
See application file for complete search history.

(56) References Cited

U.S. PATENT DOCUMENTS

| | | | |
|---|---|---|---|
| 5,168,946 A | 12/1992 | Dorgan | |
| 5,195,600 A | 3/1993 | Dorgan | |
| 6,656,074 B2 * | 12/2003 | Andriani | B62D 11/18 180/6.2 |
| 6,953,408 B2 | 10/2005 | Thompson | |
| 7,410,437 B2 | 8/2008 | Garnett | |
| 7,498,796 B2 * | 3/2009 | Georgeson | B23B 49/00 324/260 |
| 7,757,797 B2 | 7/2010 | Döbereiner | |
| 8,813,879 B2 | 8/2014 | Walter | |
| 2004/0116228 A1 * | 6/2004 | Thompson | B60K 7/0007 475/28 |
| 2005/0187067 A1 * | 8/2005 | Dobereiner | B60K 6/48 477/5 |

FOREIGN PATENT DOCUMENTS

| | | |
|---|---|---|
| DE | 602 06 481 T2 | 6/2006 |
| DE | 11 2006 002 280 T2 | 9/2008 |
| WO | 02/083482 A1 | 10/2002 |
| WO | 2005/054041 A1 | 6/2005 |
| WO | 2009/013454 A1 | 1/2009 |

OTHER PUBLICATIONS

International Search Report Corresponding to PCT/ EP2014/ 053050 mailed May 21, 2014.
Written Opinion Corresponding to PCT/ EP2014/053050 mailed May 21, 2014.

* cited by examiner

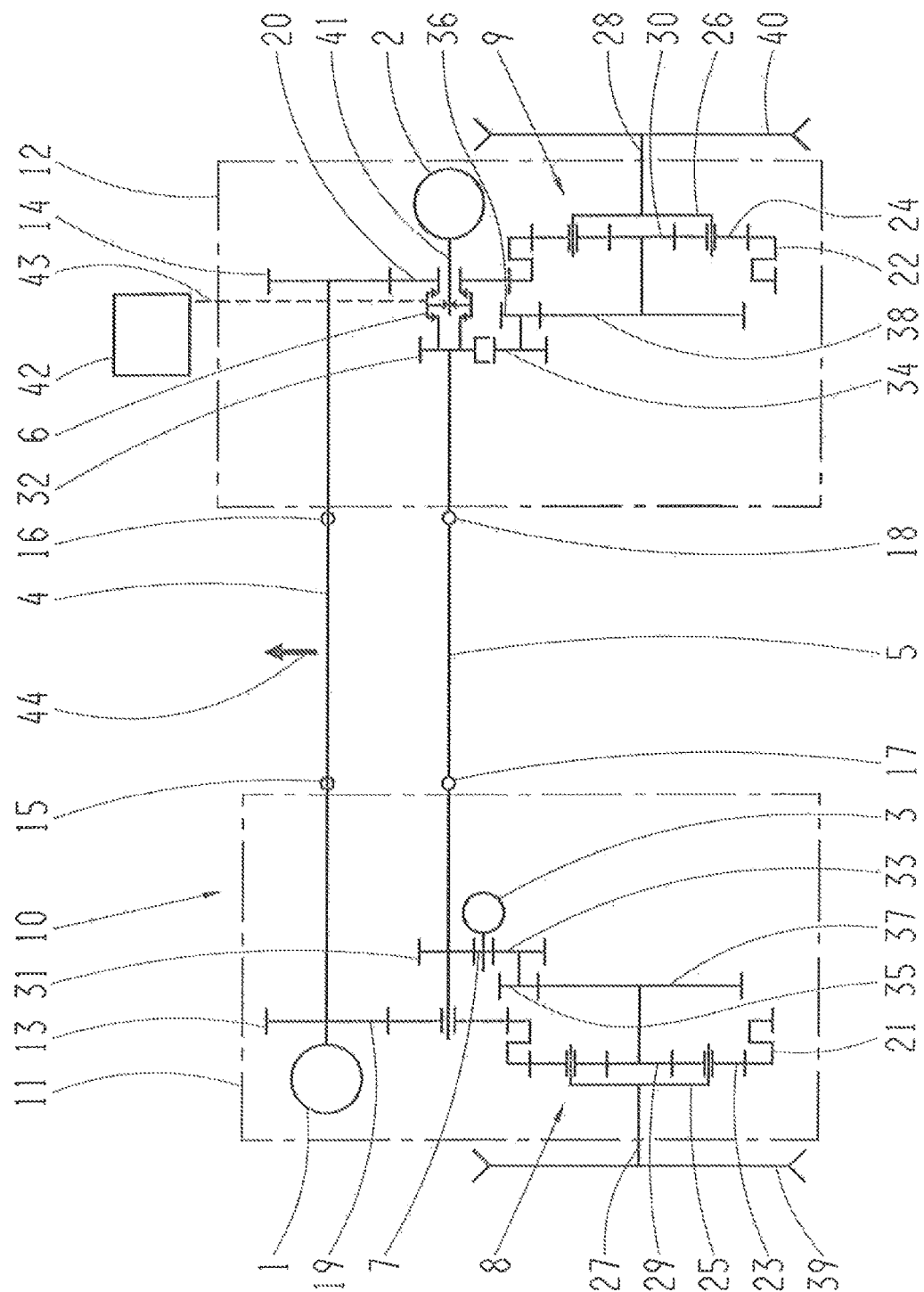

DRIVE DEVICE FOR A TRACKED VEHICLE

This application is a National Stage completion of PCT/EP2014/053050 filed Feb. 18, 2014, which claims priority from German patent application serial no. 10 2013 204 672.3 filed Mar. 18, 2013.

FIELD OF THE INVENTION

The invention concerns a drive mechanism for a tracked vehicle having an electric drive motor and an electric steering motor, with a mechanical connection for transmitting the reactive power when driving round a bend.

BACKGROUND OF THE INVENTION

To drive round a bend, in tracked vehicles the track on the side of the vehicle on the outside of the bend is driven faster than the track on the side of the vehicle on the inside of the bend. During this the mechanical power on the track on the outside of the bend is much higher than on the track on the inside of the bend. This results in the production of so-termed reactive power, which circulates between the sides of the vehicle on the inside and outside of the bend. In conventionally driven tracked vehicles with a combustion engine and a steering transmission, this reactive power circulates from the track on the outside of the bend, via the ground, to the track on the inside of the bend and then, by way of cross-shafts, namely a neutral shaft and a central shaft, back to the track on the outside of the bend.

Various electric motor drive mechanisms for tracked vehicles are already known. The electrical energy for the electric motors is for example supplied by a generator driven by an internal combustion engine. In a simply designed version of an electric motor drive mechanism for tracked vehicles, each of the two tracks is driven directly by a separate electric motor. In this case each electric motor provides both the drive power and the steering power for the associated side or track of the vehicle. However, this has the disadvantage that when rounding a bend the reactive power cannot be transmitted via a mechanical connection such as a cross-shaft and must therefore be supplied by the electric motors. Because of that the electric motors of such a drive mechanism have to be greatly oversized, and this leads to higher costs and increased vehicle weight.

From DE 60206481 T2 a drive configuration for tracked vehicles is known, which avoids the disadvantage of over-size electric drive motors. This is achieved in that a conventional drive mechanism is modified with a neutral shaft and a central shaft in such manner that an electric drive motor is arranged on the central shaft and drives it, and an electric steering motor is arranged on the neutral shaft and drives it. Thus, when driving round a bend the reactive power described can be transmitted from the track on the outside of the bend to the track on the inside of the bend by means of mechanical elements consisting essentially of the neutral shaft and the central shaft.

Besides, still other electric motor drive mechanisms for tracked vehicles are known, in which, while rounding a bend the reactive power is transmitted from one drive side to the other drive side by mechanical drive elements. For example, WO 2009/013454 A1 describes a drive mechanism for tracked vehicles with a respective electric drive motor and a respective electric steering motor for each drive side or track. In this case the two drive motors each drive a respective driveshaft which drive their associated tracks respectively on each side of the tracked vehicle. To drive round a bend steering power or steering rotational movement is transmitted by the steering motors via a centrally positioned differential transmission to the two driveshafts. Thus, here too the reactive power while rounding a bend can be supported, namely by means of the differential transmission.

However, all the electrical drive mechanisms described above demand relatively high electric power and therefore take up a relatively large amount of fitting space in the tracked vehicle and thus is no longer available as access space or payload space. In addition, the necessary electric drive power increases the overall weight and the operating costs of the tracked vehicle.

SUMMARY OF THE INVENTION

The objective on which the invention is based is achieved by a drive mechanism as described below.

According to these, a drive mechanism for a tracked vehicle comprises an electric drive motor for the provision of drive power and an electric steering motor for the provision of steering power. In addition, the drive mechanism comprises mechanical drive elements for transmitting a reactive power between a right-hand and a left-hand drive side or track when rounding a bend. According to the invention an auxiliary electric motor is provided, which can selectively assist the drive motor or the steering motor. This means that, as necessary, the torque of the drive motor and the torque of the auxiliary motor are available as drive power, or the torque of the steering motor and the torque of the auxiliary motor are available for steering.

Thus, the auxiliary motor can selectively be connected into the force flow of the drive motor or into the force flow of the steering motor, depending on the purpose for which in the particular driving situation the greater power is needed. For example, to drive straight ahead rapidly the auxiliary motor can be switched to assist the drive motor so as to achieve the highest speed. In contrast, to drive round a bend with a small radius very high steering power is required. The highest steering power is needed when pivoting, as it is called, i.e. when the tracked vehicle is turned about its vertical axis. During this the track on the right-hand drive side rotates forward and the track on the left-hand side backward, or vice-versa, while the propulsion drive is still. Turning about one track also demands very high steering power. Accordingly, for pivoting, turning about one track and driving round bends of small radius, it is advantageous to switch the auxiliary motor into the force flow of the steering motor.

Since they can be assisted as necessary by the auxiliary motor, the drive motor and the steering motor can be made less powerful and smaller than in conventional electro-mechanical drive mechanisms for tracked vehicles, in which the drive motor has to deliver the maximum drive power alone and the steering motor the maximum steering power alone.

Preferably, the drive mechanism has a clutch by means of which, in a first shift position the auxiliary motor can be connected selectively into the force flow of the drive motor and in a second shift position into the force flow of the steering motor. A clutch suitable for this is in particular a simple clutch that acts with interlock. To facilitate and accelerate the shifting of the clutch, the clutch can be made with a synchronization device. Another possibility for improving the shifting processes at the clutch is to provide a control unit. With the help of the control unit, the rotational speed of the auxiliary motor can be adapted in such manner that an interlocking clutch can be engaged quickly and without problems even without a synchronization device. However, other types of clutches such as frictional clutches with and without synchronizing devices can also be used.

Preferably, besides the first and second shift positions described the clutch also has a third, neutral shift position, in which the auxiliary-motor is decoupled from the rest of the drive mechanism. Thus, in this third, neutral shift position the drive motor alone drives both tracks for driving forward or for reversing, whereas the steering motor alone is responsible for the necessary rotational movements for steering the tracked vehicle. In the third, neutral shift position the auxiliary motor has no influence on the drive power or on the steering.

Advantageously, the third, neutral shift position of the clutch is between the first and second shift positions, so that by design a simultaneous mechanical connection between the central shaft and the neutral shaft by the clutch is excluded.

Preferably, the mechanical connection comprises a central shaft that can be driven by the drive motor and a neutral shaft that can be driven by the steering motor. The force flows conducted by way of the central and neutral shafts are combined on each drive side by a summing gearset, so as to drive the track concerned by means of a respective drive output element of the summing gearset.

The summing gearsets are bolted for example onto a vehicle sump as individual components. To compensate any tolerances and operation-related relative movements between the summing gearsets, the cross-shafts connected thereto, namely the central shaft and the neutral shaft, can be made flexible, in particular as articulated shafts.

The central shaft and the neutral shaft can preferably be arranged one behind the other in the travel direction and at least approximately at the same height in the area of a floor of the vehicle, in order to provide a free passage or one as large as possible into the inside space of the tracked vehicle. When the cross-shafts are arranged near the floor the diameters of the gearwheels on the cross-shafts and the diameters of the electric drive and steering motors connected to the cross-shafts have to be allowed for. If necessary, an axial offset between the drive motor and the central shaft or between the steering motor and the neutral shaft can be produced by an additional spur gear stage.

The summing gearsets are preferably in the form of planetary gearsets. In that case the ring gears of the planetary gearsets are connected to the central shaft so that the force flow for drive-power passes by way of the ring gear of the planetary gearset concerned into the summing gearset. The planetary carrier forms the drive output element of the summing gearset concerned and is functionally connected to the associated track on the same drive side. The sun gear of each summing gearset is connected to the sun gear of the summing gearset on the other drive side by way of the neutral shaft and other transmission elements. This mechanical connection between the right-hand and left-hand drive sides is called the steering power-train in the present document.

To steer the tracked vehicle the track on the outer side of the bend has to be driven faster than the track on the inner side of the bend. During driving round the bend this is achieved in that by way of the neutral shaft the steering motor drives the sun gear of the summing gearset on the outside of the bend in the same rotational direction as the ring gear on that side is driven by the drive motor via the central shaft, and in that the sun gear on the inside of the bend is at the same time driven by the steering motor in the direction opposite to that in which the associated ring gear is driven by the drive motor via the central shaft. For pivoting, the ring gears are fixed and only the sun gears, the planetary gearwheels and the planetary carriers of the two summing gearsets rotate on the right-hand and left-hand sides in opposite rotational directions.

The opposite rotational directions of the sun gears of the two summing gearsets are produced in that in the steering power-train, an additional gearwheel is arranged on one drive side, which reverses the rotational direction on that side. In other words, the additional gearwheel reverses the steering rotational movement of the neutral shaft on one drive side compared with the steering rotational movement on the other drive side. Accordingly, the additional gearwheel in this step is called the reversing gearwheel.

So that when driving straight the sun gears of the summing gearsets will remain stationary even without being supported and will not therefore bring about any steering rotational movement, they are reciprocally supported by the neutral shaft. Then, the supporting torques of the right and left drive sides cancel out.

The steering motor is preferably arranged on the reversing gearwheel described, which is arranged in the force flow between the neutral shaft and one of the two summing gearsets. Because of this the power demand in one rotational direction of the steering motor is at least approximately the same size as the power demand in the other rotational direction. This contributes toward the desired reduction of the power demand at the steering motor.

Further preferred embodiments of the invention aim to keep the necessary fitting space for the drive mechanism as a whole as small as possible and to arrange the individual drive components spatially in such manner that the space available is used as effectively as possible, so that for example as large as possible an opening for rear entry in a rear-driven tracked vehicle is created. A rear-side track drive is advantageous from the standpoint of track loading and track wear. Despite this, protected entry of the occupants from behind or from the rear side should be possible, as is desired in military tracked vehicles. In the context of the present invention, the electric motors can for example be arranged laterally in the area of the summing gearsets so that the central area can be used for rear entry.

Another of these preferred designs provides that the auxiliary motor is arranged on the drive side opposite to that of the steering motor. In another design the clutch is preferably arranged spatially between a gearwheel connected fixed to the neutral shaft and a gearwheel in the force flow of the central shaft, also in the lateral area of a summing gearset.

The drive mechanism claimed can preferably be controlled with the help of, for example, an electric control unit. The control unit can control the drive mechanism as a function of a steering handle position and an accelerator pedal position, in such manner that the auxiliary motor described assists either the drive motor or the steering motor. In this way, depending on the situation the torque from the auxiliary motor can be made-available for assisting the drive motor or the steering motor. For that purpose the control unit can control the above-described clutch and, with the help of appropriate actuating elements, shift it to the first, second or third shift position.

The control by means of the control unit is implemented in such manner that reliable steering of the tracked vehicle is ensured in any driving situation. In that way, for example, the acceleration while driving round a bend can be smaller than when driving straight ahead, because in that case the auxiliary motor is linked to the steering motor and no additional power is available for the drive motor.

Finally, the present invention also covers a tracked vehicle in which a drive mechanism as described above is arranged as a rear drive in the rear area of the vehicle.

BRIEF DESCRIPTION OF THE DRAWINGS

Below, the invention and further advantages thereof are explained in more detail with reference to a schematic drawing. The sole drawing shows schematically the structure of an example embodiment of the drive mechanism according to the invention.

DETAILED DESCRIPTION OF THE PREFERRED EMBODIMENTS

The drive mechanism 10 according to the invention has a left-hand drive side 11 and a right-hand drive side 12. Two cross-shafts, namely the central shaft 4 and the neutral shaft 5, connect the two drive sides 11 and 12 to one another and thus form a mechanical connection of the drive mechanism between the left-hand and right-hand drive sides 11 and 12. With reference to the driving direction arrow 44 it can be seen that the central shaft 4 and the neutral shaft 5 are arranged one behind the other in the driving direction. This enables the two cross-shafts 4, 5 to be arranged at the same level near the floor of the vehicle. Particularly in combination with an advantageous arrangement of the electric motors 1, 2 and 3 described in more detail below, this enables free access into the vehicle for rear entry in a tracked vehicle with rear drive.

The electric drive motor 1 for providing the drive power is arranged on the left-hand drive side 11. The electric drive motor 1 is in driving connection with the central shaft 4. The central shaft 4 is designed as an articulated shaft in order to be able to compensate tolerances and relative movements between the left-hand and right-hand drive sides 11 and 12 or between the left-hand and right-hand summing gearsets 8 and 9. For this, the central shaft 4 has two articulations 15 and 16. Fixed to the central shaft 4 are two gearwheels 13 and 14, the gearwheel 13 being arranged on the left-hand drive side 11 and the gearwheel 14 on the right-hand drive side 12.

On the left-hand drive side, the gearwheel 13 meshes with an intermediate wheel 19. In turn, this intermediate wheel 19 is in driving connection with a ring gear 21. The connection can be realized for example by teeth arranged on the outer circumference of the ring gear 21. The ring gear 21 is part of a summing gearset 8, which is arranged on the left-hand drive side 11 and is in the form of a planetary gearset.

The planetary gearwheels 23 of the summing gearset 8 mesh on the outside with inner teeth of the ring gear 21 and on the inside with the teeth of a sun gear 29. The planetary gearwheels 23 are mounted to rotate on a planetary carrier 25. The planetary carrier 25 forms the drive output element of the summing gearset 8 and is connected to a drive output shaft 27 that carries a track drive wheel 39 on the left-hand side, which in turn drives a track (not shown) of the tracked vehicle on the left-hand side.

Instead of a direct connection between the drive output shafts 27 and 28 and the track wheels 39 and 40, other auxiliary transmissions can also be used. The so-termed lateral countershafts reduce the torques in the drive units 11 and 12. Furthermore, service and parking brakes can also be arranged on the drive output shafts 27 and 28.

On the right-hand drive side 12, the gearwheel 14 meshes with an intermediate wheel 20. In turn the intermediate wheel 20 is in driving connection with a ring gear 22. This connection can for example be formed by teeth arranged on the outer circumference of the ring gear 22. The ring gear 22 is part of a summing gearset 9 arranged on the right-hand drive side 12 and made in the form of a planetary gearset.

The planetary gearwheels 24 of the summing gearset 9 mesh on the outside with the inner teeth of the ring gear 22 and on the inside with the teeth of a sun gear 30. The planetary gearwheels 24 are mounted to rotate on a planetary carrier 26. The planetary carrier 26 forms the drive output element of the summing gearset 9 and is connected to a drive input shaft 28, which carries a right-hand track drive wheel 40 which, in turn, drives a right-hand track (not shown) of the tracked vehicle.

Instead of a direct connection between the drive output shafts 27 and 28 and the track wheels 39 and 40, other auxiliary transmissions can also be used. The so-termed lateral countershafts reduce the torques in the drive units 11 and 12. Furthermore, service and parking brakes can also be arranged on the drive output shafts 27 and 28.

The sun gears 29 and 30 of the two summing gearsets 8 and 9 are mechanically connected to one another by way of the neutral shaft 5 and other transmission elements. By virtue of this mechanical connection, which in this document is also known as the steering power-train, on the one hand the steering power of a steering motor 3 is transmitted to the track drive wheels 39 and 40, and on the other hand the reactive power described earlier when driving round a bend is transmitted via this mechanical connection. The neutral shaft 5 is in the form of an articulated shaft, in order to be able to compensate tolerances and relative movements between the left-hand and right-hand drive sides 11 and 12 or between the left-hand and right-hand summing gearsets 8 and 9. For that purpose the neutral shaft has two articulations 17 and 18.

In the steering power-train, on the left-hand drive side 11 there is arranged an additional gearwheel 7, which reverses the rotational direction in the steering power-train on the left-hand side 11 relative to the rotational direction on the right-hand drive side 12. Accordingly, the additional gearwheel is called the reversing gearwheel.

An electric steering motor 3, which supplies power for steering, is arranged on the left-hand drive side 11. The corresponding steering rotational movement and the torque are transmitted from the steering motor 3 by way of the steering power-train with the neutral shaft 5 to the respective summing gearset 8 or 9 on the left-hand or right-hand drive side 11 and 12. The electric steering motor 3 is arranged directly on the reversing gearwheel 7 and passes its torque, the steering torque, via the reversing gearwheel 7 into the steering power-train.

On the left-hand drive side 11, the steering power of the steering motor 3 is conducted by the reversing wheel 7 to a gearwheel 37 via two further gearwheels 33 and 35 that are connected solidly to one another. In turn, the gearwheel 37 is connected solidly to the sun gear 29, by way of which the steering power is introduced into the summing gearset 8 in the form of a planetary gearset. Thus, the reversing gearwheel 7 engages with the gearwheel 33 and the gearwheel 35 engages with the gearwheel 37.

To transmit the steering power of the steering motor 3 to the right-hand drive side 12, the reversing gearwheel 7 is connected to the sun gear 30 by way of the neutral shaft 5 and the gearwheels 32, 34, 36 and 38. By means of the sun gear 30, the steering power is introduced into the right-hand summing gearset 9 in the form of a planetary gearset. The reversing gearwheel 7 engages with the gearwheel 31, which is fixed on the neutral shaft 5 on the left-hand drive side 11. A gearwheel 32 connected solidly to the neutral shaft 5 on the right-hand drive side 12, meshes with the gearwheel 34, which is connected solidly to the gearwheel 36. In turn, the gearwheel 36 meshes with a gearwheel 38, which is connected solidly to the sun gear 30.

The gearwheels described are preferably in the form of straight-toothed or helical-toothed spur gears.

The reversing gearwheel 7 also ensures that when driving in a straight line the sun gears of the summing gearsets remain still even without support and bring about no steering rotational movements, because they support one another reciprocally via the neutral shaft. In this case the torques from the right-hand and left-hand drive sides 11 and 12, which are oppositely directed, act simultaneously on the reversing gearwheel 7 and the assisting torques of the right-hand and left-hand drive sides cancel out.

An electric auxiliary motor 2 is provided on the right-hand drive side 12. Selectively, this assists the drive motor 1 or the steering motor 3. The rotary movement and the torque of the auxiliary motor 2 are selectively directed by means of a shiftable clutch 6 either to the drive power-train or to the steering power-train, so that the auxiliary motor 2 can selectively be connected into the force flow of the drive motor 1 or into the force flow of the steering motor 3. For this, the clutch 6 has three shift positions. In a first shift position the drive output shaft 41 of the auxiliary motor 2 is in driving connection with the drive power-train, i.e. by way of the central shaft 4 with the drive motor 1. In a second shift position the drive output shaft 41 of the auxiliary motor 2 is in driving connection with the steering power-train, i.e. by way of the neutral shaft 5 with the steering motor 3. And in a third shift position the drive output shaft 41 of the auxiliary motor 2 is not connected to either of the power-trains, i.e. it is mechanically separated from the rest of the drive mechanism 10. The third shift position is therefore called the neutral position.

To control the clutch 6, a control unit 42 is provided, which is connected by a control line 43 to an actuating element (not shown) of the clutch 6. With the help of the control unit 42 the clutch 6 can be shifted as necessary between the three shift positions described. The control unit 42 is provided with previously determined data on the current steering handle position and the accelerator pedal position of the vehicle, so that depending on that information the control unit 42 can control and shift the clutch 6. The control unit 42 can be for example a control device for controlling the drive-train 10 or a central control unit of the tracked vehicle.

The arrangement of the electric motors 1, 2 and 3 described in the example embodiment can also be varied in the context of the invention, provided that the drive connections described are preserved. This gives the designer of the tracked vehicle freedom to choose an arrangement in which the necessary fitting space is used optimally in relation to as large as possible an access passage for rear entry, the maximum possible payload inside the tracked vehicle, or the fitting of other aggregates in the tracked vehicle.

Within the scope of the invention it is also possible, instead of just one drive motor and just one steering motor, to provide a plurality of drive and/or steering motors, which are connected mechanically to one another in the drive power-train or the steering power-train, whereas the auxiliary motor is selectively connected into the drive power-train or the steering power-train. This gives even greater freedom for the possible arrangement and distribution of the electric motors for all the necessary drive power and steering power. Moreover, having a plurality of drive and/or steering motors increases the operating safety of the drive mechanism by virtue of the redundancy that then exists.

If the drive motor 1 should fail, the auxiliary motor 2 can maintain driving operation to a limited extent. Should the steering motor 3 fail, the auxiliary motor 2 can take over the steering. This gives a system with redundancy.

INDEXES

1 Drive motor
2 Auxiliary motor
3 Steering motor
4 Central shaft
5 Neutral shaft
6 Clutch
7 Reversing gearwheel
8 Summing gearset
9 Summing gearset
10 Drive mechanism
11 Left-hand drive side
12 Right-hand drive side
13 Gearwheel
14 Gearwheel
15 Articulation
16 Articulation
17 Articulation
18 Articulation
19 Intermediate gearwheel
20 Intermediate gearwheel
21 Ring gear
22 Ring gear
23 Planetary gearwheel
24 Planetary gearwheel
25 Planetary carrier
26 Planetary carrier
27 Drive output shaft
28 Drive output shaft
29 Sun gear
30 Sun gear
31 Gearwheel
32 Gearwheel
33 Gearwheel
34 Gearwheel
35 Gearwheel
36 Gearwheel
37 Gearwheel
38 Gearwheel
39 Track drive wheel
40 Track drive wheel
41 Drive output shaft
42 Control unit
43 Control line
44 Driving direction arrow

The invention claimed is:

1. A drive mechanism (10) for a tracked vehicle, the drive mechanism comprising:
   an electric drive motor (1) for supplying driving power,
   an electric steering motor (3) for supplying steering power,
   mechanical drive elements, when driving around a curve, transmitting reactive power between a right-hand drive side (12) and a left-hand drive side (11) of the tracked vehicle, an electric auxiliary motor (2) selectively assisting either the drive motor (1) or the steering motor (3), the drive mechanism further comprising a clutch (6) by which, in a selected first shift position, the auxiliary motor (2) is connected in a force flow of the drive motor (1) or, in a selected second shift position, the auxiliary motor (2) is connected in a force flow of the steering motor (3), a mechanical connection of the drive mechanism, between the left-hand drive side (11) and the right-hand drive side (12), comprising a central shaft (4) that is drivable by the drive motor (1) and a neutral shaft (5) that is drivable by the steering motor (3), and the force flows, conducted by way of the central shaft (4) and the neutral shaft (5), are combined for each of the left-hand drive side (11) and the right-hand drive side (12), by a respective summing gearset (8, 9), in order to drive, via the respective summing gearset (8, 9), an associated track.

2. The drive mechanism (10) according to claim 1, wherein the clutch (6) has a neutral, third shift position in which the auxiliary motor (2) is decoupled from a remainder of the drive mechanism (10).

3. The drive mechanism (10) according to claim 1, wherein the clutch (6) has a synchronization device.

4. The drive mechanism (10) according to claim 1, wherein the steering motor (3) is arranged on a reversing gearwheel (7), which is arranged in a force flow between the neutral shaft (5) and one of the respective summing gearsets (8, 9), for reversing a steering rotational movement of the neutral shaft (5) on one of the left-hand and the right hand drive sides (11) relative to the steering rotational movement on an other of the left-hand and the right hand drive sides (12).

5. The drive mechanism (10) according to claim 1, wherein the auxiliary motor (2) is arranged on one of the left-hand and the right-hand drive sides (12) that is opposite to the steering motor (3).

6. The drive mechanism (10) according to claim 1, wherein the clutch (6) is arranged spatially between a gearwheel connected solidly to the neutral shaft (5) and a gearwheel located in a force flow of the central shaft (4).

7. The drive mechanism (10) according to claim 1, wherein the neutral shaft (5) and the central shaft (4) are arranged, one behind the other in a driving direction of the vehicle, and at least approximately at a same height in an area of a floor of the vehicle.

8. The drive mechanism (10) according to claim 1, wherein the drive mechanism is controllable by a control unit, and, depending on a steering handle position and an accelerator pedal position, the auxiliary motor (2) is operatively connected to the control unit, by way of the clutch (6), either to the drive motor (1) or to the steering motor (3).

9. A tracked vehicle in combination with a drive mechanism (10), the drive mechanism comprising:
an electric drive motor (1) for supplying driving power,
an electric steering motor (3) for supplying steering power,
mechanical drive elements, when driving around a curve, transmitting reactive power between a right-hand drive side (12) and a left-hand drive side (11) of the tracked vehicle,
an electric auxiliary motor (2) selectively assisting either the drive motor (1) or the steering motor (3),
the drive mechanism further comprising a clutch (6) by which, in a selected first shift position, the auxiliary motor (2) is connected in a force flow of the drive motor (1) or, in a selected second shift position, the auxiliary motor (2) is connected in a force flow of the steering motor (3),
a mechanical connection of the drive mechanism, between the left-hand drive side (11) and the right-hand drive side (12), comprising a central shaft (4) that is drivable by the drive motor (1) and a neutral shaft (5) that is drivable by the steering motor (3), and
the force flows, conducted by way of the central shaft (4) and the neutral shaft (5), are combined for each of the left-hand drive side (11) and the right-hand drive side (12), by a respective summing gearset (8, 9), in order to drive, via the respective summing gearset (8, 9), an associated track.

10. A drive mechanism for a tracked vehicle, the drive mechanism comprising:
an electric drive motor for transmitting driving power and an electric steering motor which transmits steering power;
mechanical drive elements for transmitting reactive power between a right-hand drive side and a left-hand drive side of the tracked vehicle when the tracked vehicle is driving around a curve;
a clutch is selectively shiftable between at least a first shift position and a second shift position so that:
in the first shift position, the clutch couples an electric auxiliary motor into a force flow of the drive motor, and
in the second shift position, the clutch couples the electric auxiliary motor into a force flow of the steering motor;
a mechanical connection between the right-hand drive side and the left-hand drive side comprising a central shaft that is drivable by the drive motor and a neutral shaft that is drivable by the steering motor;
a left-hand side summing gearset combining a force flow conducted by way of the central shaft and a force flow conducted by way of the neutral shaft to drive a left-hand track on the left-hand drive side of the tracked vehicle; and
a right-hand side summing gearset combining the force flow conducted by way of the central shaft and the force flow conducted by way of the neutral shaft to drive a right-hand track on the right-hand drive side of the tracked vehicle.

* * * * *